Figure 1:
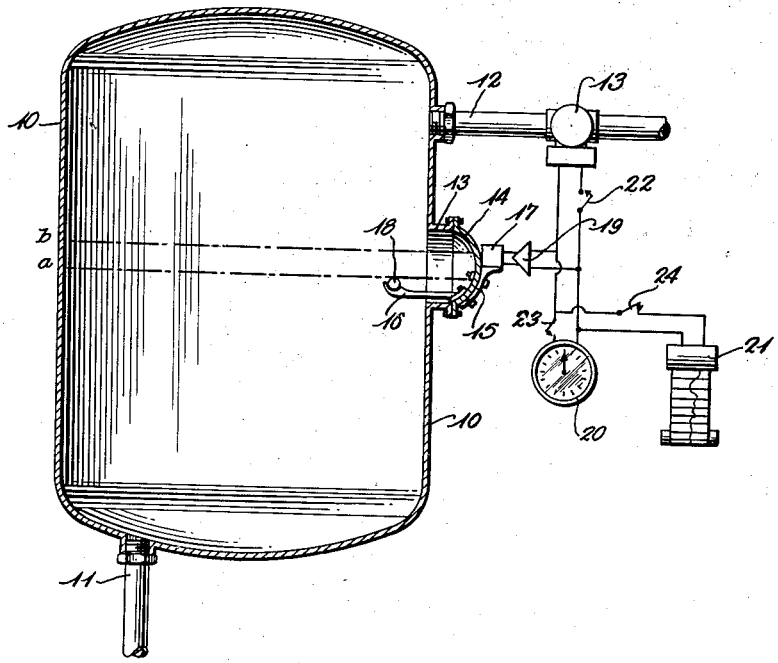

Aug. 28, 1951     O. W. GRAHAM     2,565,963
METHOD OF AND APPARATUS FOR MAKING LIQUID
LEVEL DETERMINATIONS
Filed Jan. 2, 1948

Inventor
Ollie W. Graham
By Stevens, Davis and Miller
Attorneys

Patented Aug. 28, 1951

2,565,963

UNITED STATES PATENT OFFICE 2,565,963

METHOD OF AND APPARATUS FOR MAKING LIQUID LEVEL DETERMINATIONS

Ollie W. Graham, Tulsa, Okla.

Application January 2, 1948, Serial No. 115

5 Claims. (Cl. 250—83.6)

This invention relates to the measurement and/or control of liquid level, and is more particularly concerned with the measurement and/or control of the level of a liquid in a sealed container.

In the course of a great many industrial operations, particularly in the chemical industry and those closely related to it, there is presented the problem of controlling or measuring the level of a liquid within a tank or other container which, for various reasons, must be maintained in a closed, or even sealed, condition. This problem is a complex one since in a great many instances, the container or tank must be wholly sealed to prevent the out-leakage of dangerous contaminants or the in-leakage of air.

Thus it is that conventional apparatus for the measurement and control of liquid level is frequently unsatisfactory for use with containers that must be maintained sealed or closed. The reasons why difficulties are encountered become apparent when it is borne in mind that such things as floats, sight glasses and pressure diaphragms often require that moving parts pass through the walls of the tank or container with the concomitant requirement that said moving parts be provided with adequate sealing gaskets or packing glands to protect the tank against leakage. Packing glands are subject to wear, and to maintain them in leak-proof condition, while avoiding interference with the accuracy of the instrument, is a practical problem of no small moment. Electrical control apparatus overcomes some of the foregoing disadvantages but introduces the problem of arcing and the incident danger of explosion. Furthermore, all of the prior art liquid level measuring devices have in common the disadvantage of disposing parts that require maintenance within the tank so that removal of those parts for inspection and repair is required periodically with resulting maintenance expense.

In an effort to overcome the foregoing disadvantages there has been developed a scheme involving the disposition of a source of radiant energy on an outside wall of a container and a radiation detector on an opposite outside wall thereof. The detector lies in the same plane as the source and the output of the detector is connected to a valve which controls flow of liquid to the container. Since the output of the detector will vary with the received radiant energy, and since the received energy will vary with the nature of the intervening medium, it is apparent that the liquid serving as an intervening medium can control or indicate its own level.

The foregoing type of arrangement has the advantage that no connections through the container wall need be made. On the other hand, it has the disadvantage that the source is remote from the detector, to the extent of the width of the container, which requires the use of either a large quantity of highly expensive radioactive material as a source in order to insure adequate response on the part of the detector, or else a detector of very high sensitivity. Furthermore, since the detector and source are in the same plane, the cut-off, when the liquid intervenes in the radiation path, is so sharp that the control device is often actuated very frequently in maintaining the liquid level at the predetermined level. This causes undesirable wear on the control apparatus and extra expense incident to the consumption of additional operating power.

It is therefore an object of the present invention to provide liquid level measurtment and/or control apparatus of the radiant energy type which is characterized by reliability in operation, low radiant energy requirements, and low power requirements on the part of the level measuring or controlling mechanism.

It is a further object of this invention to provide liquid level measuring and/or control apparatus of a unitary nature which can be quickly, conveniently and safely applied to containers in such a manner as to obviate entirely the danger of container leakage, while rendering the unit readily accessible for inspection.

It is proposed as a specific feature of the present invention to locate a source of radiant energy within a container near, but spaced from, a wall thereof and to provide a vertically offset detector on or near the exterior wall of that container in vertically offset receiving relation to the detector, so that the output of the detector changes gradually from the stable value, when no liquid intervenes between the source and detector, to the stable value when the intervening space is fully occupied by liquid, whereby the power requirements of the control or indicating mechanism and the wear to which it is subjected are substantially reduced.

Figure 2:
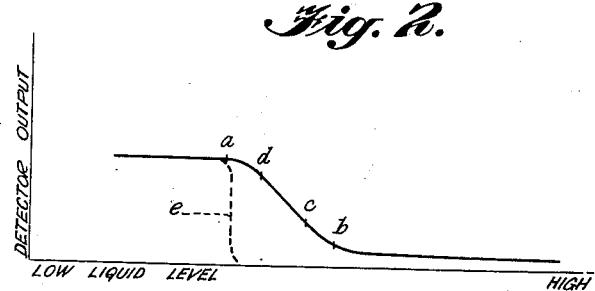

Other objects and advantages of the invention will be apparent from a consideration of the following detailed description of an embodiment thereof in conjunction with the annexed drawings wherein:

Figure 1 is a schematic vertical sectional view of a tank equipped with liquid level control and/or indicating apparatus constructed in accordance with the teachings of the present invention; and Figure 2 is a graphical representation of the output characteristics of the detector plotted against level fluctuation.

Now referring to Figure 1 in greater detail, the numeral 10 designates a tank containing a liquid which is periodically drawn off to use through the outlet 11. The tank 10 is supplied with liquid through a conduit 12 provided with a flow control device such as a solenoid-operated valve 13. The side of the tank 10 is provided with a boss 13 which is provided with a flange adapted to receive a pressure cap 14 in sealed relation thereagainst. The pressure cap 14, which is dome-shaped, is provided with a pair of brackets 15 and 16, the bracket 15 extending to the exterior of the cap and supporting thereon a radiation detector 17. The inner bracket 16 extends somewhat into the interior of the tank and supports thereon a radiation source 18 which is spaced from the detector 17 and vertically offset with respect thereto. The detector 17 is connected to an amplifier 19 and the output of the amplifier is connected to the solenoid-operated valve 13 to a register 20 and to a recorder 21. In the circuits to the solenoid-operated valve 13, the register 20 and the recorder 21, there may be disposed switches 22, 23 and 24 respectively, so that the solenoid, register and recorder may be operated separately or concurrently as particular conditions of operation may require.

The register 20 is diagrammatically indicated as a dial calibrated in liquid level and provided with a moving pointer. The recorder 21 is diagrammatically indicated as of the moving-tape type in which a tape calibrated in timed intervals is driven past a pin controlled by the output from the amplifier. Since all of the elements controlled from the amplifier are conventional, it is apparent that any suitable forms thereof may be employed in addition to those shown in the drawings. Similarly, a pump motor can be substituted for the valve motor at 13, and, in some instances, the whole apparatus may be applied to the withdrawal conduit rather than the supply conduit to the tank.

It can now be seen that between the upper surface of the radiation source 18 and the access aperture of the detector 17 there lies a zone defined by two horizontal planes, which are represented in the drawings by reference characters $a$ and $b$.

It will be apparent that, when the level in the tank is below the plane of the source 18, the output of the detector will be at a maximum value, see Figure 2, but that as the liquid level rises above the source 18, and lies between said source and the plane of the detector 17, the output of the detector will gradually fall to the minimum value which exists when all the tank space between the source and the detector is filled with liquid.

It is now apparent that considerable latitude can be afforded in the manner of operation of the device due to the gradual downward curve in the output of the detector during the change in level from $a$ to $b$ and vice versa. For example, the circuits may be so arranged that the solenoid 13 will move the valve in the conduit 12 to open position when the point $c$ is reached, and will cut off again when the point $d$ is reached. This will allow the level to be established with but a single cycle of operation of the solenoid 13, while it is apparent that if the detector 17 lay in the same horizontal plane as the source 18, it might very well be that the solenoid 13 would have to be actuated three or four times in the course of the establishment of the level due to the fact that the curve plotting liquid level against detector output would then appear in the general form of the broken line curve $e$ of Figure 2.

In operation, with a curve of the type shown at $e$ in Figure 2, the slightest irregularity in the surface such as wave action produced by vibrations or the introduction of liquid from the pipe 12, would cause a temporary fluctuation of level between the detector and the source of sufficient magnitude to change the detector output from one extreme position to the other, thereby causing actuation of the valves. A shift in the wave movement might cause an immediate reversal of the detector output, and so on, causing the operation of the valve 13 to occur quite a number of times for each level-establishing operation. It can be seen therefore that an advantage is achieved in locating the detector in a plane vertically offset relative to the radiation source. Obviously the same results could be achieved if the radiation source were located above rather than below the detector, as shown in Figure 1.

Regardless of the advantages achieved by the vertical offset between the detector and the radiation source, a substantial advantage is achieved in placing the radiation source close to the detector, but sufficiently spaced from it to allow liquid to intercept the path of the radiations between the source and the detector, since radiant energy follows the law of inverse squares, so that by placing the radiation source close to the detector, a smaller supply of radioactive material can be used at 18, or less amplification is required of the detector output. It is apparent that this advantage is achieved even when the detector and source lie in substantially the same horizontal plane, and it is intended that this arrangement be regarded as a part of the present invention.

Heretofore throughout the specification reference has been made to 15 as a source of radiant energy. This source may be a gamma ray source such as radium or mesothorium, or may be a neutron source such as a mixture of radium and beryllium or any other producer of detectable radiations. The source is suitably protected against the action of the liquid in the tank by a covering material which does not function as a radiation shield.

The detector is an ionization chamber of conventional design but has a power supply with very stable voltage control and stable amplification of the output.

While but a single radiation source has been shown, it is apparent that the graded cut-off features of the present invention can be achieved by using a plurality of radiation sources arranged in vertically offset relationship.

Various other modifications of this invention may be made without departure from the scope thereof as defined in the annexed claims.

What is claimed is:

1. Liquid level apparatus comprising a liquid container, a radiation source located in a fixed position within said container in spaced relation to a wall thereof, and a radiation detector located outside of said container wall in a plane vertically offset with respect to the plane of the radiation source but in a position to receive radiations from said source, whereby the output of the radiation detector may be used to operate registers, recorders, liquid level control devices or the like.

2. Liquid level apparatus comprising a liquid container, a radiation source located in a fixed position within said container adjacent but in spaced relation to a wall thereof, and a radiation detector located outside of said container wall in a plane below the plane of the radiation source and in a position to receive radiations from said source, whereby the output of the radiation detector may be used to operate registers, recorders, liquid level control devices or the like.

3. Liquid level apparatus comprising a liquid container having an access opening in one side wall thereof defined by a flanged, outwardly projecting boss, a closure cover seated on the boss flange and sealing the access opening, a bracket extending from the inner face of said closure cover, another bracket extending from the outer face of said closure cover, a radiation source supported on said first-named bracket and a radiation detector supported on said second-named bracket, the source, radiation detector and the brackets being so arranged that the straight line path from the source to the radiation detector is inclined to the horizontal when the closure cover is in position.

4. The method of detecting variations in liquid level that comprises establishing a radiation source and a detector in vertically offset fixed relationship with the radiation path between the source and the detector occupying at least a portion of the fluctuation path of the liquid the level of which is to be detected, the radiation path between the radiation source and radiation detector being a straight line inclined to the horizontal.

5. The method of detecting variations in liquid level within a closed container that comprises maintaining a radiation source within the container at a predetermined fixed point adjacent a wall thereof, maintaining a radiation detector on the outside of the container adjacent said detector but vertically offset relative thereto, and amplifying the output of the detector during fluctuations of the liquid level causing the liquid to intercept the radiation path between the source and the detector.

OLLIE W. GRAHAM.

REFERENCES CITED

The following references are of record in the file of this patent:

UNITED STATES PATENTS

| Number | Name | Date |
|---|---|---|
| 2,323,128 | Hare | June 29, 1943 |
| 2,348,810 | Hare | May 16, 1944 |
| 2,378,219 | Hare | June 12, 1945 |
| 2,456,233 | Wolf | Dec. 14, 1948 |

OTHER REFERENCES

Review of Scientific Instruments, vol. 17, Nov. 1946, p. 517.